(12) United States Patent
Scott et al.

(10) Patent No.: US 8,155,630 B2
(45) Date of Patent: Apr. 10, 2012

(54) COMMUNICATIONS SYSTEM PROVIDING MOBILE DEVICE NOTIFICATION BASED UPON PERSONAL INTEREST INFORMATION AND CALENDAR EVENTS

(75) Inventors: Sherryl Lee Lorraine Scott, Toronto (CA); Jason T. Griffin, Kitchener (CA); Mark Church, Waterloo (CA); Scott Reeve, Waterloo (CA); Michael K. Brown, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 532 days.

(21) Appl. No.: 12/394,131

(22) Filed: Feb. 27, 2009

(65) Prior Publication Data
US 2010/0222033 A1    Sep. 2, 2010

(51) Int. Cl.
*H04M 3/42* (2006.01)
(52) U.S. Cl. .................. 455/414.1; 455/412.2
(58) Field of Classification Search .......... 455/561, 455/502, 67.11, 436, 423, 433; 370/335, 370/331, 394, 399, 442, 328, 469, 235; 375/E1.002, 375/147, 141, 146
See application file for complete search history.

(56) References Cited

U.S. PATENT DOCUMENTS

| | | | |
|---|---|---|---|
| 6,208,996 B1 | 3/2001 | Ben-Shachar et al. | 707/104.1 |
| 6,745,193 B1 | 6/2004 | Horvitz et al. | 707/101 |
| 6,842,767 B1 | 1/2005 | Partovi et al. | 709/203 |
| 7,130,820 B2 | 10/2006 | Song | 705/26 |
| 7,941,127 B2 * | 5/2011 | Griffin | 455/414.1 |
| 7,996,481 B2 * | 8/2011 | Stillman et al. | 709/207 |
| 2002/0138345 A1 | 9/2002 | Dickson et al. | 705/14 |
| 2004/0003048 A1 * | 1/2004 | Stillman et al. | 709/207 |
| 2004/0137886 A1 * | 7/2004 | Ross et al. | 455/414.1 |
| 2004/0181604 A1 | 9/2004 | Immonen | 709/232 |
| 2004/0203963 A1 | 10/2004 | Shivaram et al. | 455/466 |
| 2004/0243712 A1 * | 12/2004 | Sakai et al. | 709/227 |
| 2007/0112762 A1 | 5/2007 | Brubaker | 707/5 |
| 2008/0189169 A1 | 8/2008 | Turpin et al. | 705/10 |
| 2009/0201850 A1 * | 8/2009 | Davis et al. | 370/328 |
| 2010/0191454 A1 * | 7/2010 | Shirai et al. | 701/201 |
| 2010/0211431 A1 * | 8/2010 | Lutnick et al. | 705/10 |

OTHER PUBLICATIONS

Mahmoud, *Provisioning-Context-Aware Advertisements to Wireless Mobile Users*, 2006 IEEE International Conference on Multimedia and Expo, Jul. 9-12, 2006, pp. 669-672.

* cited by examiner

*Primary Examiner* — Nick Corsaro
*Assistant Examiner* — Mahendra Patel
(74) *Attorney, Agent, or Firm* — Allen, Dyer, Doppelt, Milbrath & Gilchrist, P.A. Attorneys at Law

(57) ABSTRACT

A communications system may include at least one mobile wireless communications device for storing personal interest information for respective contacts and for storing calendar event data. The system may further include a notification server communicating with the at least one mobile wireless communications device via a wireless communications network and configured to access the personal interest information and calendar event data from the at least one mobile wireless communications device, and send notifications to the at least one mobile wireless communications device based upon the personal interest information and the calendar event data.

19 Claims, 11 Drawing Sheets

US 8,155,630 B2

COMMUNICATIONS SYSTEM PROVIDING MOBILE DEVICE NOTIFICATION BASED UPON PERSONAL INTEREST INFORMATION AND CALENDAR EVENTS

TECHNICAL FIELD

The present disclosure relates to the field of communications systems, and, more particularly, to wireless communications systems, devices and related methods.

BACKGROUND

Mobile communications systems continue to grow in popularity and have become an integral part of both personal and business communications. Mobile telephones allow users to place and receive voice calls most anywhere they travel. Moreover, as mobile telephone technology has increased, so too has the functionality of mobile devices and the different types of devices available to users. For example, many mobile devices now incorporate personal digital assistant (PDA) features such as calendars, address books, task lists, etc. Moreover, such multi-function devices may also allow users to wirelessly send and receive electronic mail (email) messages and access the Internet via a cellular network and/or a wireless local area network (WLAN), for example.

As a result, users continue to spend more time using their mobile devices during the course of a day, as opposed to early cellular phones that were used only for phones calls. This has resulted in a significant interest from the advertising community in targeting advertisements to mobile devices.

DETAILED DESCRIPTION

Figure 1:
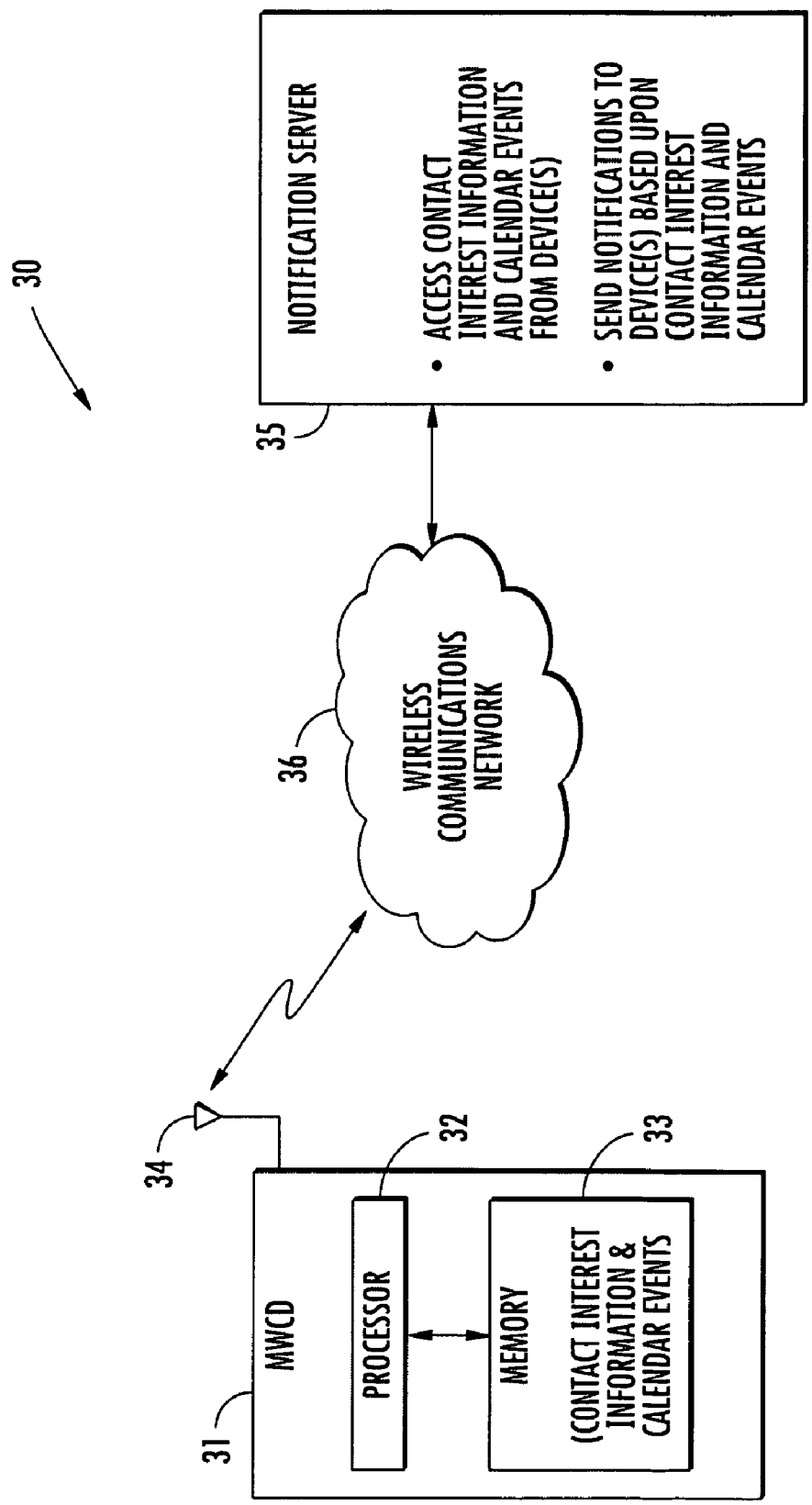
FIG. 1 is a schematic block diagram of a communications system providing mobile wireless communications device notification features in accordance with an exemplary embodiment.

The present description is made with reference to the accompanying drawings, in which exemplary embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements or steps in different embodiments.

Generally speaking, a communications system is disclosed herein which may include at least one mobile wireless communications device for storing personal interest information for respective contacts and for storing calendar event data. The system may further include a notification server communicating with the at least one mobile wireless communications device via a wireless communications network and configured to access the personal interest information and calendar event data from the at least one mobile wireless communications device, and send notifications to the at least one mobile wireless communications device based upon the personal interest information and the calendar event data.

In one embodiment, the notification server may send the notifications to the at least one mobile wireless communications device based upon proximity to an upcoming calendar event. By way of example, the notification server may send the notifications to the at least one mobile wireless communications device with increasing frequency based upon increasing proximity to the upcoming calendar event. The notifications may include advertisements, for example. Further, the personal interest information may include contact interest information for respective contacts, products of interest, or both.

In addition, the at least one mobile wireless communications device may also be for exchanging electronic mail (email) messages with contacts, and the notification server may also send the notifications based upon the email messages. The notification server may be operable over the Internet for accessing additional contact interest information, and the notification sever may also send the notifications based upon the additional contact interest information. Moreover, the at least one mobile wireless communications device may also be for storing Internet addresses for the additional contact interest information (e.g., storing the Internet addresses of contact Web pages), and the notification server may further accesses the stored Internet addresses from the at least one mobile wireless communications device.

In some embodiments, the notification server may send the notifications based upon bids submitted from a plurality of notification sources. By way of example, the at least one mobile wireless communications device may be at least one cellular communications device.

A related communications method may include storing calendar events and personal interest information in at least one mobile wireless communications device. The method may further include accessing the personal interest information and calendar events from the at least one mobile wireless communications device using a notification server communicating with the at least one mobile wireless communications device via a wireless communications network, and sending notifications to the at least one mobile wireless communications device from the notification server via the wireless communication network based upon the personal interest information and the calendar events.

Figure 2:
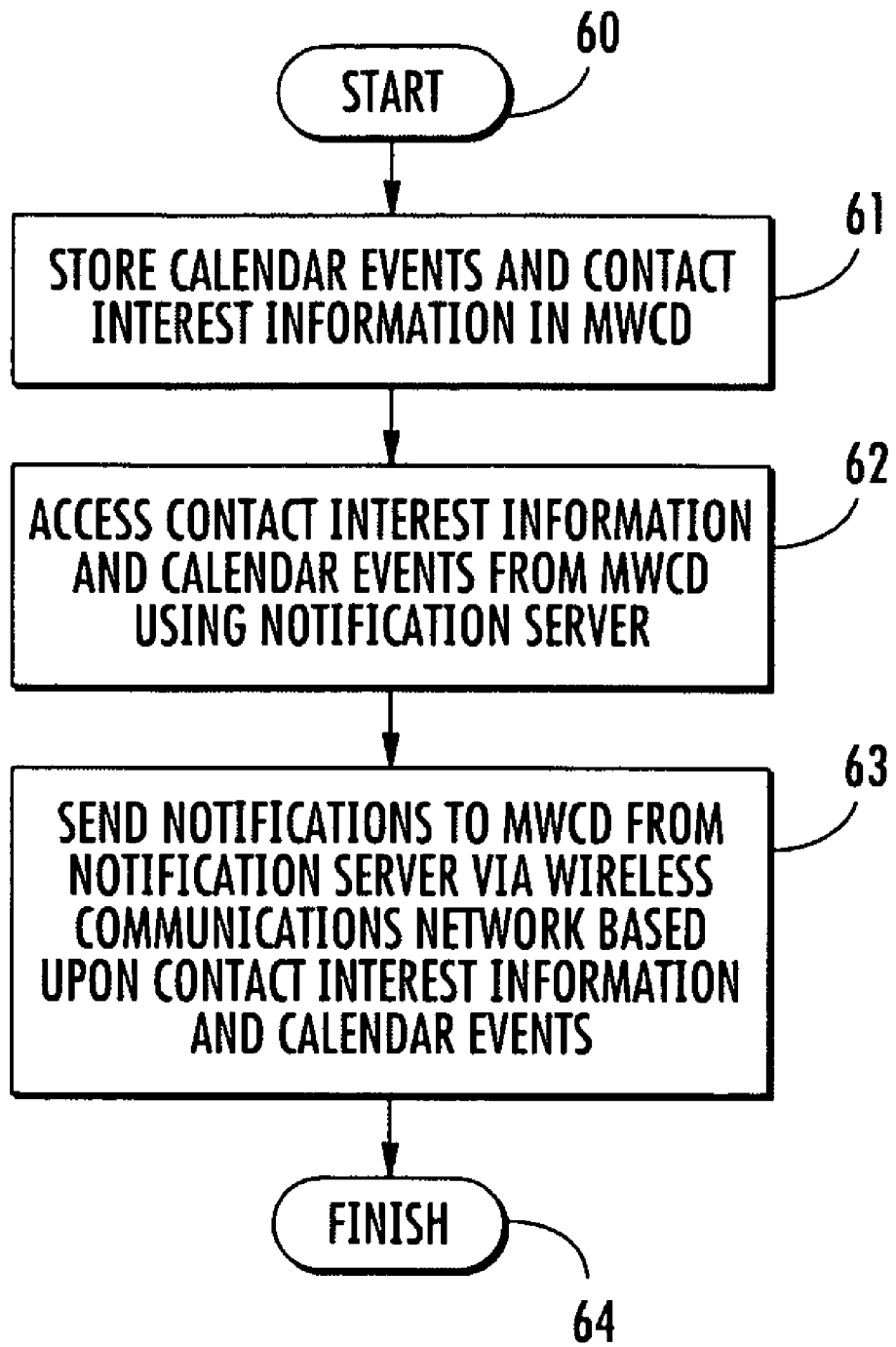
FIG. 2 is a flow diagram illustrating communication method aspects providing mobile wireless communications device notification features in accordance with an exemplary embodiment.

Referring initially to FIGS. 1 and 2, a communications system 30 and associated method aspects are first described. The system 30 illustratively includes one or more mobile wireless communications devices 31 (MWCDs), a notification server 35, and a wireless communications network 36 through which the device(s) and notification server communicate. The device 31 illustratively includes a processor 32 (e.g., a microprocessor) and associated memory 33 (e.g., FLASH, removable memory (e.g., SD card), etc.) for running one or more software applications to store information such as contact interest information and calendar events (Blocks 60-61), as will be discussed further below.

By way of example, the device 31 and wireless communications network 36 may operate in accordance with a cellular, wireless LAN (e.g., 802.11x, Bluetooth, etc.), WiMAX, satellite, etc., communications format, as will be appreciated by those skilled in the art. In some embodiments, more than one such wireless communications format may be used in the same device (e.g., cellular, wireless LAN, and Bluetooth). Moreover, the device 31 also illustratively includes one or more associated antennas 34. Various types of mobile wireless communications devices may be used, such as mobile phones, PDAs, laptop computers, wireless-enabled cameras, wireless-enabled media players, etc., for example.

Figure 5:
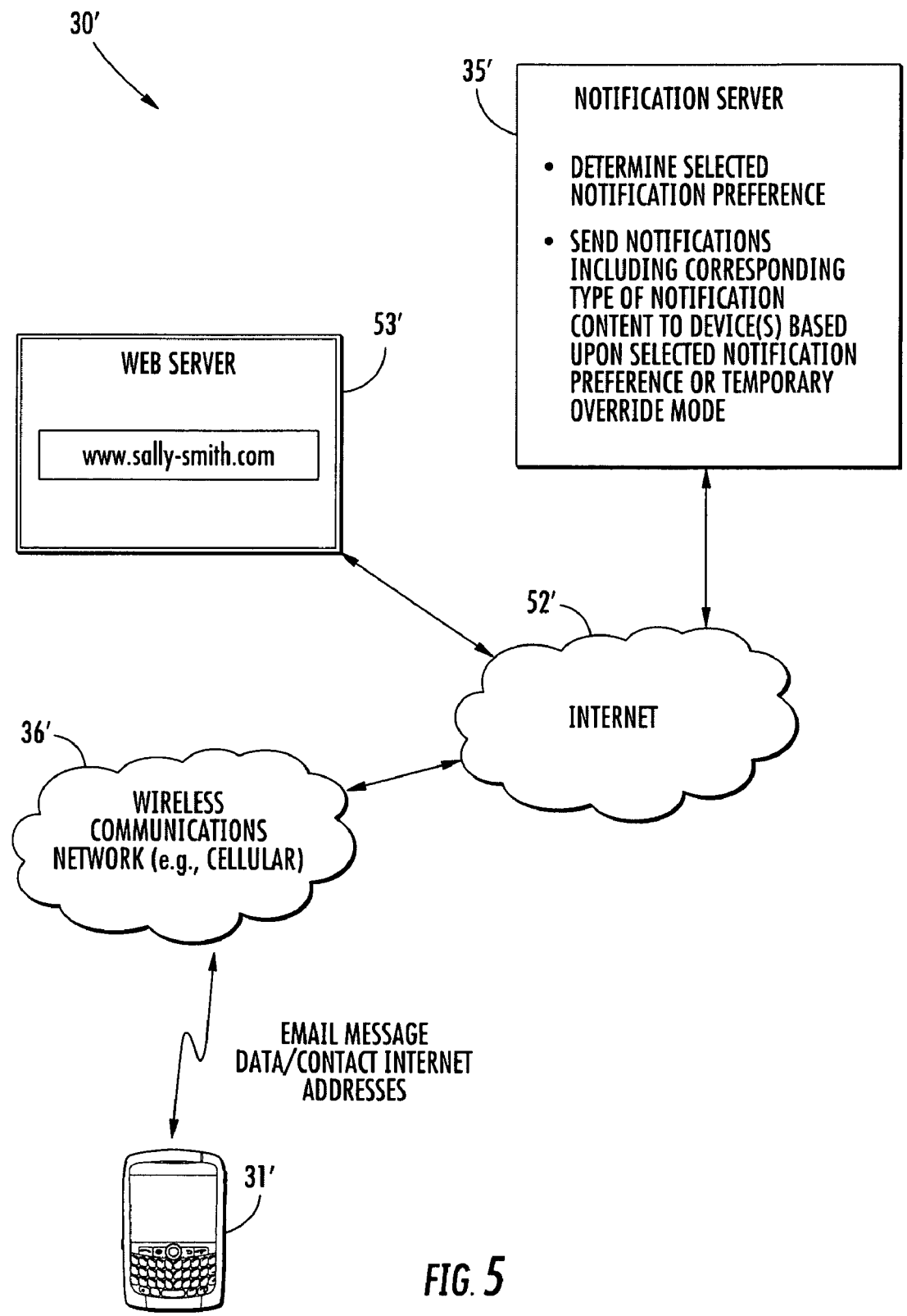
FIG. 5 is a schematic block diagram of an alternative embodiment of the system of FIG. 1.

Generally speaking, the notification server 35 communicates with the device 31 via the wireless communications network 36 for accessing the contact interest information and calendar events from the device, at Block 62, and sending notifications to the device based thereon, at Block 63, thus concluding the method illustrated in FIG. 5 (Block 64). This may be done in different ways. In one embodiment, the notification server 35 may periodically or intermittently prompt the device 31 to provide the calendar/preference information. Another approach is for the device 31 to provide this information to the notification server 35 at various times, such as upon a change in preference settings by the user.

Figure 3:
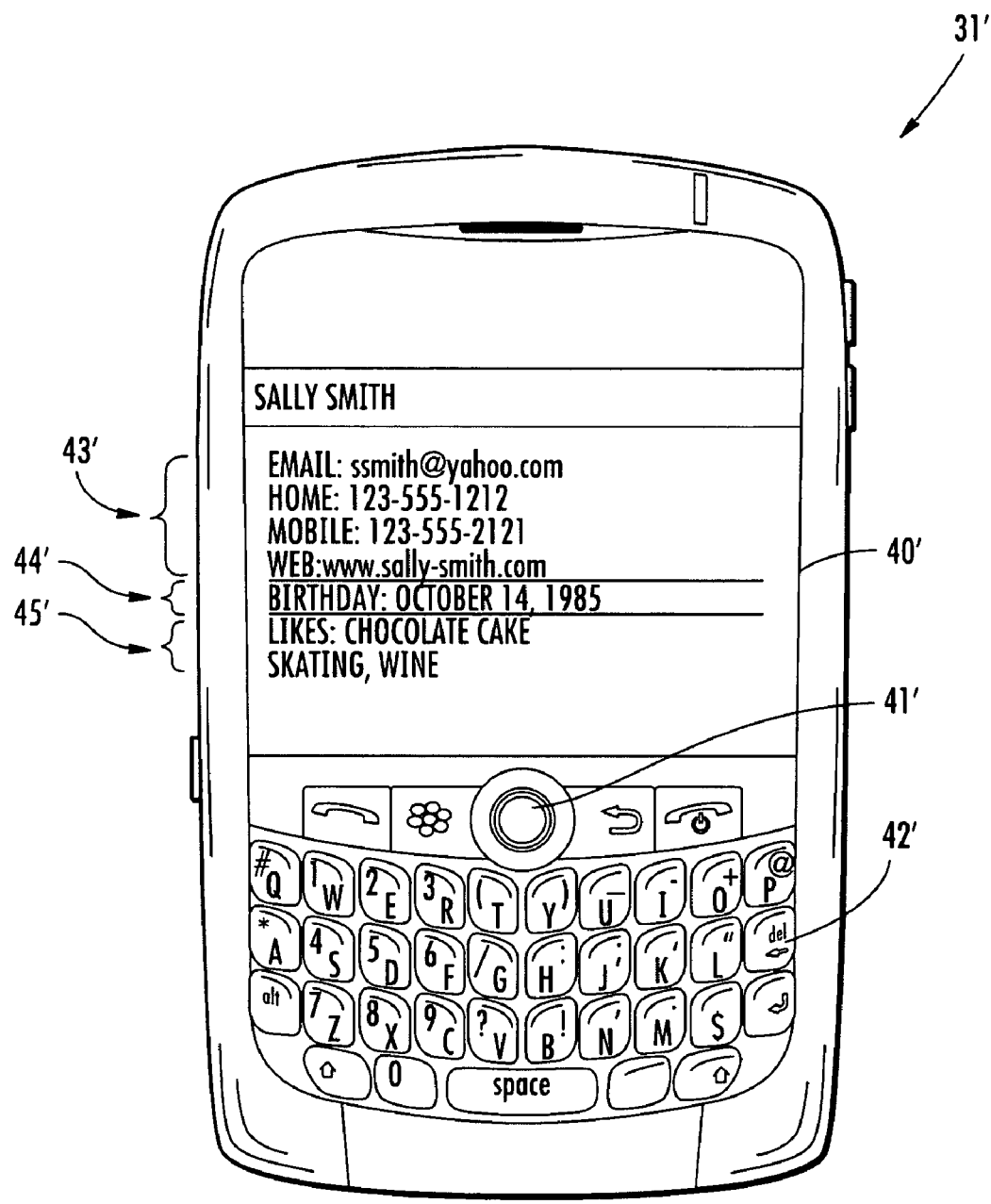
FIG. 3 is a front view of an exemplary mobile wireless communications device that may be used with the system of FIG. 1 and displaying calendar event and contact interest information.
Figure 4:
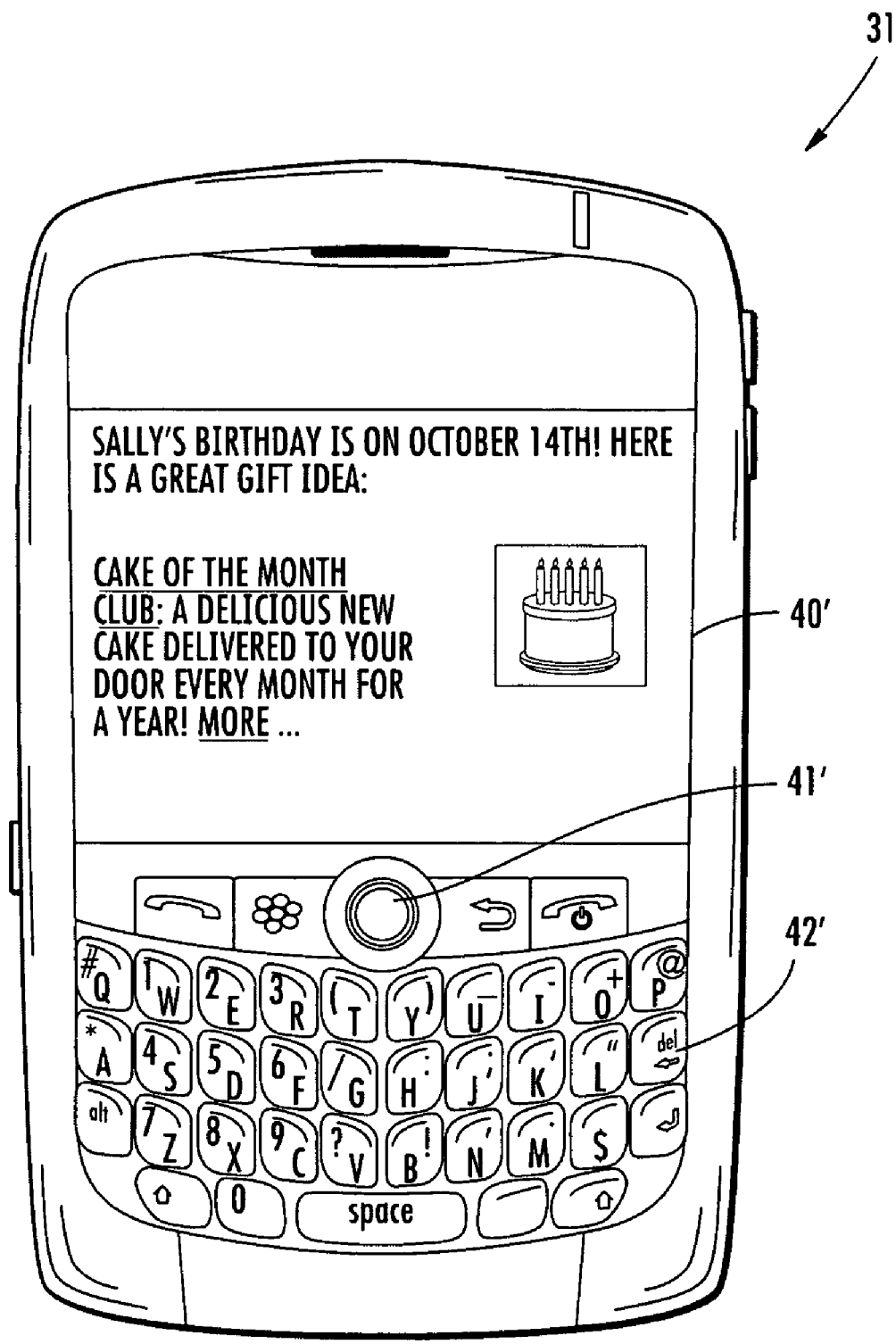
FIG. 4 is a front view of the device of FIG. 3 displaying an advertisement resulting from the calendar event and contact interest information.

Turning more particularly to FIG. 3 through 5, an exemplary embodiment is shown in which the mobile device 31' comprises a smart phone with PDA features. The device 31' illustratively includes a display 40' providing a user interface as shown, and one or more user input devices, such as a track ball 41' and a key pad 42', although various other types, combinations, or both, of user input devices may also be used. In the present example, a contact or address book application is running on the device 31' which displays a contact entry for "Sally Smith." A first field 43' includes Sally's contact information, namely an email address (ssmith@yahoo.com), home phone number (123-555-1212), mobile phone number (123-555-2121), and Sally's Web page address (www.sallysmith.com). A second field 44' illustratively includes Sally's birth date (Oct. 14, 1985), and a third field 45' includes the contact interest information. Here, the contact's (i.e., Sally's) interests or likes include chocolate cake, skating, and wine. This information may be entered by the user of the device 31' via the keypad 42', by a computer that synchronizes with the device, etc., as will be appreciated by those skilled in the art. Dislikes may also be used. For example, a person may not like nor want to wear certain colors. As another example, someone may not drink alcohol or not eat meat or pork, etc., due to religious beliefs, or may be allergic to nuts, etc. Age also may be used as a factor in determining advertising recommendations.

It will be appreciated that the illustrated contact information is merely exemplary, and that the same or different information fields may be included in other embodiments. For example, in addition to or instead of the user's website address, other Web profile information may be stored, such as a MySpace® or Facebook® profile or other social networking site profile. Further, other important dates for the contact may also be stored, such as anniversaries, cultural or religious holidays celebrated by the contact, etc. Additionally, further contact information such as home or work addresses, phone numbers, fax numbers, etc., may also be included in a given contact or address book profile, as will be appreciated by those skilled in the art.

By creating profiles for contacts, the notification server 35' may advantageously provide recommendations as to suitable gifts for the calendar event occasions, e.g., for birthdays, Christmas, etc. The linking of personal interests with specific calendar dates allows advertisements to be provided based upon current inventory (e.g., to "push" overstocked items to matching personal interests), as well as items that are seasonal or time limited to those with calendar events for which products or gifts are needed in the given time period. In accordance with one example, a user may enter a contact's birthday into the device calendar and the contact's profile into the address book profile. A shopping list may be created for the contact based upon any notes that the user adds about the contact, or from entry fields that allow likes or preferences to be stored, such as for a sport, product, or otherwise. This may be done with entry fields in the address book application such as "likes," "dislikes," "wants," "has," "needs," etc. Such items may also be included in a user's shopping list, notes, memos, etc.

By providing the ability on the mobile device 31' to create such entries for oneself as well as contacts such as friends, family members, etc., when an item or interest is included in a shopping list for the user or associated with a contact, the notification server 35' may then send notifications (e.g., advertisements) relevant to what the user wishes to purchase for themselves or a contact. Moreover, by associating the interests to a calendar event, such as a birthday for a contact, as the proximity to the birthday increases (i.e., the date gets closer) the user then advantageously receives advertisements or other notifications based on the item.

In the example of FIGS. 3 and 4, the advertisement relates to cakes, since one of the "likes" in Sally Smith's profile is "chocolate cake." That is, the contact or user interest information may include products or other items or activities of interest to respective contacts or the user, and the advertisements correspond to the products or items or activities of interest. The advertisement seen in FIG. 4 is for a cake of the month club because this corresponds with Sally's interest in cakes, and it is provided along with a helpful reminder that Sally's birthday is approaching on October 14th. Of course, notifications and advertisements may take other forms in different embodiments than the one shown in the present example.

Figure 6:
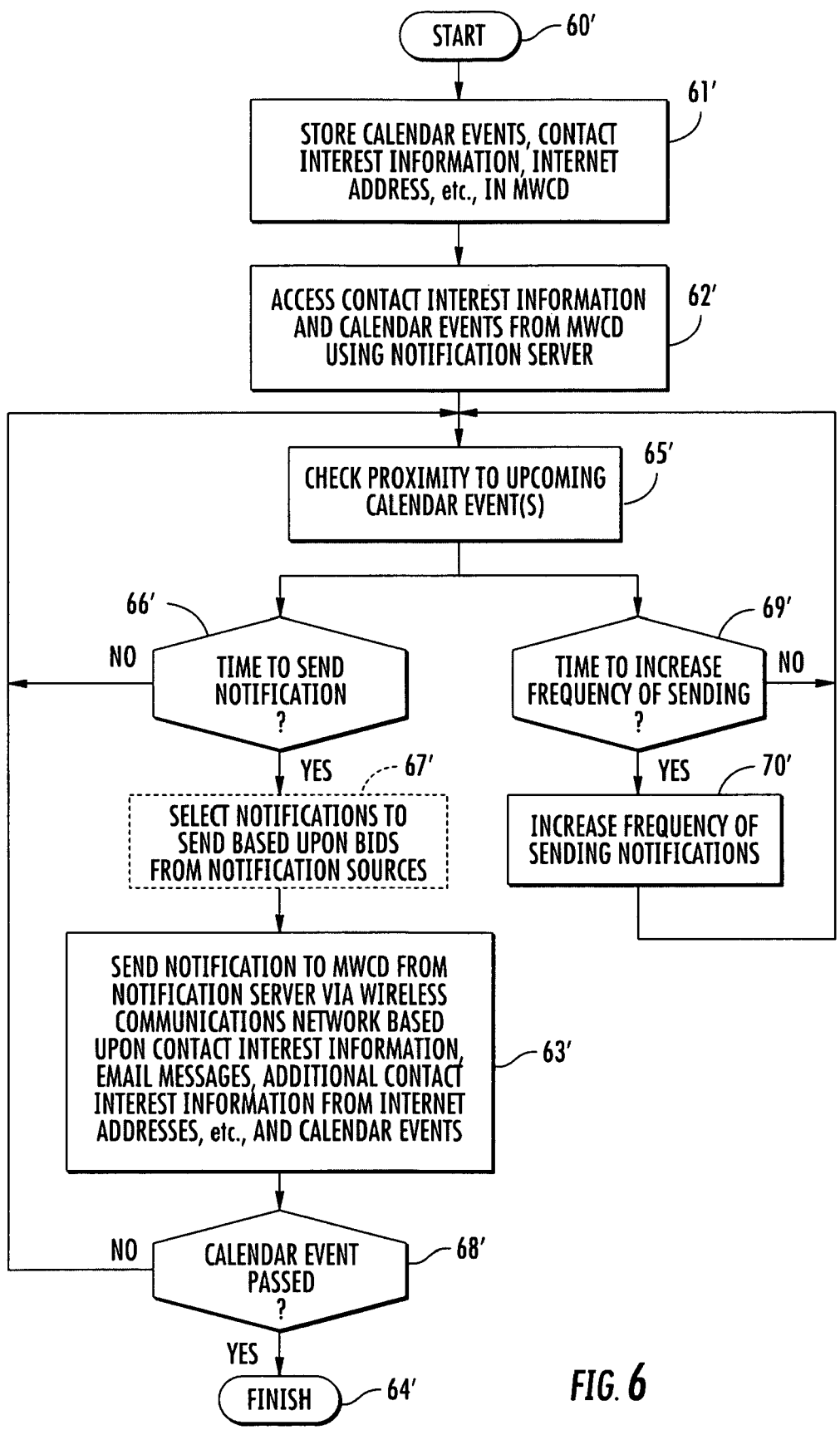
FIG. 6 is a flow diagram illustrating additional communication method aspects in accordance with an alternative embodiment.

A related communications method is now described with further reference to FIG. 6. Beginning at Block 60', the method illustratively includes storing calendar events and contact interest information for respective contacts in the device 31', and accessing the contact interest information and calendar events from the device using the notification server 35' via the wireless communications network 36', at Blocks 61'-62', as noted above. If proximity to the calendar event is such that sending a notification to the device 31' is warranted (e.g., it is within one month of the event), at Blocks 65'-66', the notification is sent to the mobile device 31' from the notification server 35' via the wireless communication network 36' based upon the contact interest information and the calendar events, at Block 63'. Another way to use calendar data is mining calendar data with respect to past events. For example, per one might have a calendar event for a dinner with the contact from a month ago, and a gift card for that restaurant or for similar restaurants may be suggested.

In some embodiments, the notification server 35' may optionally send the notifications based upon bids submitted from a plurality of notification sources, at Block 67'. For example, advertisers or other notification providers may bid to have advertisements for their respective goods or services sent to users who have indicated a preference, either for themselves or for their contacts. In the above noted example, the cake vendor that bid the highest amount that they would be willing to pay to have their cake advertisement sent to a user indicating "cakes" as an interest would have their advertisement sent first to the mobile device 31'. Moreover, as a particular calendar event approaches, notifications such as advertisements may cost more to place (i.e., the price of the advertisements may be changed based upon proximity to the calendar event). Various approaches for receiving and selecting bids for advertisements will be appreciated by those skilled in the art which may be used herein, and bidding need not be required in all embodiments.

Moreover, the notifications may also be based upon not only the information included in a user's shopping list, contact profile, etc., but may further be based upon preference information included in emails exchanged between the user and contacts (or others), for example. For instance, copies of the email stored on the mobile device 31' or on an email server (which may also be the notification server 35' in some embodiments, though it need not be in all embodiments), could be searched for key words that will trigger particular types of notifications. For examples, references in emails to a particular type of sports may result in notifications or offers for tickets related to sporting events, sports apparel, etc. Other forms of communications may also be "mined" for such preference information, such as short message service (SMS) messages, instant messages (IM), text converted from phone conversations, weblogs or blogs, etc.

One way to conceptually categorize how information about personal interest information is determined or captured is that such information may be considered as static or dynamic content. Static content may be considered to be what the user enters in a wish list, etc., whereas dynamic content may be considered to be information mined from emails, blogs, etc. Potentially, information most recently entered or sent in an email, etc., is particularly relevant, so the notification server 35' may advantageously move items up in a ranking in terms of what may be recommended versus what is to be listed in a shopping list, etc., as will be appreciated by those skilled in the art. If there is any ambiguity in what a contact intends or desires, the notification server 35' may also advantageously send an email, etc., to a given user asking what that person would prefer as a gift, and then send the updated information to a friend attempting to buy or contribute to a gift for the given user.

Similarly, another source for obtaining personal or contact preference information may be user or contact websites, such as a personal Web page, blog, MySpace or other social networking page, etc. That is, the notification server 35' may be operable over the Internet 52' for accessing additional contact interest information, and the notification sever may also send the notifications based upon the additional contact interest information. More specifically, the notification server 35' may access such Internet addresses from the mobile device 31'. In the example of FIG. 5, Sally Smith's personal Web page, www.sally-smith.com, is hosted by a Web server 53'. The notification server 35' (or other computer) first accesses this URL (or IP address) from the stored profile on the mobile device 31', for example, and then accesses Sally's Web page accordingly to search the text thereof for key words that will trigger particular types of notifications, as will be appreciated by those skilled in the art.

In accordance with one example utilizing social network entries, a user may set up a shopping list with a link to Sally's social network page. If Sally enters something on her social network page that she likes as a "Favorite" or "Wish list" item, the notification to the mobile device 31' could indicate that "Sally has just indicated she would "love to have a new pair of purple high heel shoes". From this notification the user may be provided with product recommendations and options such as "add item to shopping list," "buy now," or "set a reminder for Sally's birthday," etc.

The notifications associated with a particular calendar event may continue to be presented to the mobile device 31' until the event has passed, at Block 68', for example. In some embodiments, the notification server 35' may advantageously send the notifications to the mobile device 31' with increasing frequency based upon increasing proximity to the upcoming calendar event, at Blocks 69', 70'. That is, the notification server 35' may send notifications such as advertisements to the mobile device 31' more frequently as the calendar event draws nearer. Various schedules for sending of notifications may be used in different embodiments, as will be appreciated by those skilled in the art. Another trigger which may increase the frequency of sending of notifications, for example, is a request from the user for suggestions for gift ideas for the upcoming event (e.g., Sally's birthday).

If Sally's Birthday is not stored in the mobile device calendar, there may be a queue to "add to Calendar." This type of queue may occur if the information is captured from an email communication from Sally that "my birthday is coming up and I'd like a new pair of purple shoes," for example. Another possibility is that a user may choose to add a "Buy by <date>" when a notification is sent to her indicating an item that someone would like. A user may receive a message that "Jason would like a video game," which the user would choose to add to her shopping list, but also indicate that she would like to buy this by <date>. This may be added to her calendar, or tagged in a shopping list as a "Purchase By . . ." item.

In accordance with various examples, advertisements may be facilitated based upon a user a shopping list for a holiday (e.g., Christmas, Easter, etc.), possible gift ideas for an anniversary, etc. Another example may be a travel alert based upon a stored itinerary in the mobile device 31'. Notification may also be based upon searches of application data to identify memberships such as the American Automobile Association (AAA) or Canadian Automobile Association (CAA), for example. Another possibility is gearing the notifications towards enterprise users for travel or procurement of IT materials, etc.

The foregoing embodiments may be particularly advantageous in that a user may have a shopping list/wish list on their mobile device 31' to which he or she can add items to at any time. This list may then be used "real time," or on an "as needed" basis from a user's perspective to get the best deal at the time he or she wishes to purchase a particular item or service. Because of the ability to more directly target likely customers, this may advantageously permit additional discounts to be given to users through coupons, etc., than the user may otherwise be able to obtain by simply going into a store without an advertisement provided by the notification server 35', although this need not be the case in all embodiments.

Figure 7:
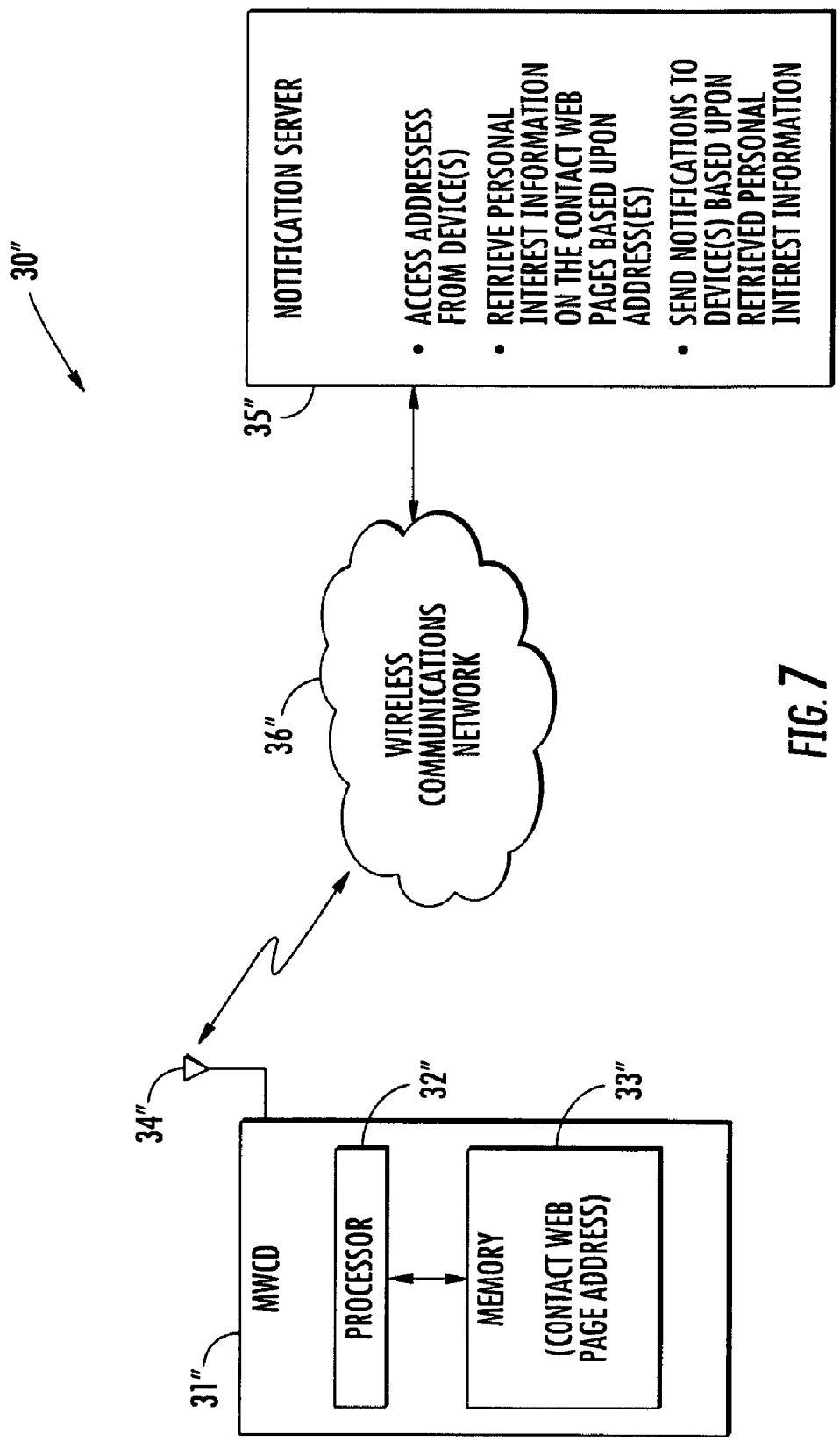
FIG. 7 is schematic block diagram of another communications system in accordance with an exemplary embodiment.
Figure 8:
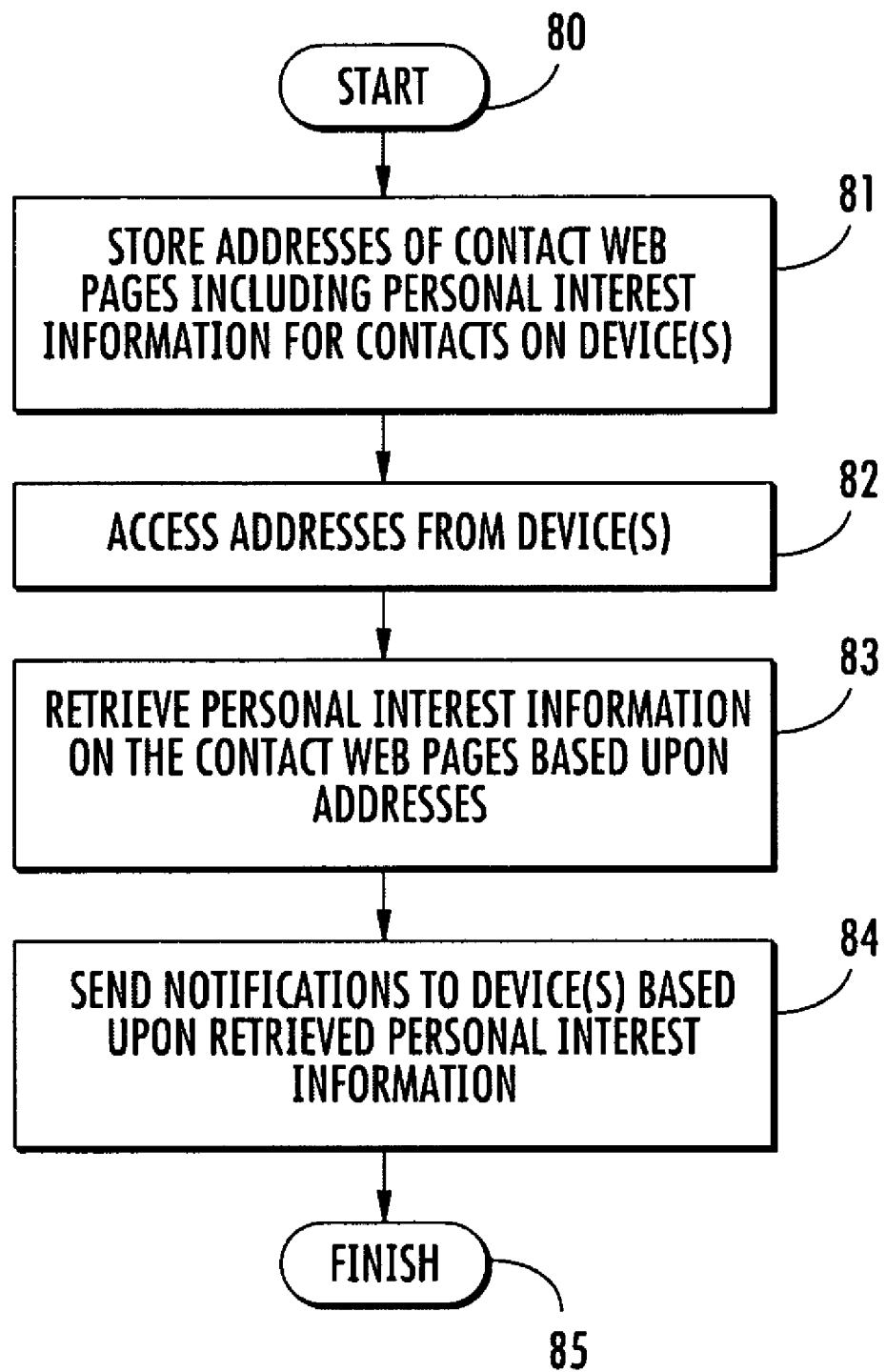
FIG. 8 is a flow diagram illustrating communication method aspects associated with the system of FIG. 7.

Turning additionally to the alternative system 30" and method illustrated in FIGS. 7 and 8, the notification server 35" may advantageously access the addresses of one or more contact Web pages (e.g., MySpace®, Facebook®, etc.) stored on the device 31", at Blocks 80-82, retrieve personal interest information on the contact Web pages based upon the addresses, at Block 83, and send notifications to the device(s) based upon the retrieved personal interest information, at Block 84, thus concluding the method illustrated in FIG. 8 (Block 85). More particularly, in the illustrated embodiment the notification server 35" need not access calendar information stored on devices 31" prior to searching contact Web pages for the contacts' personal interest information, although stored calendar events (and personal interest information stored on devices 31") may also be used, as discussed above.

It should be noted that, in some embodiments, the contact addresses may be in other locations beside Web pages. For example, native applications for MySpace® and Facebook® may be used, for example, that do not use a Web browser interface and would not necessarily involve storing a web page address for a contact's web page (e.g., www.myspace.com/username). Also Facebook® and MySpace® have their own contact lists, and these may or may not be synchronized to the device address book. Facebook® & MySpace® also have their own calendars, and these may or may not be synchronized to the mobile device 31 calendar.

Figure 9:
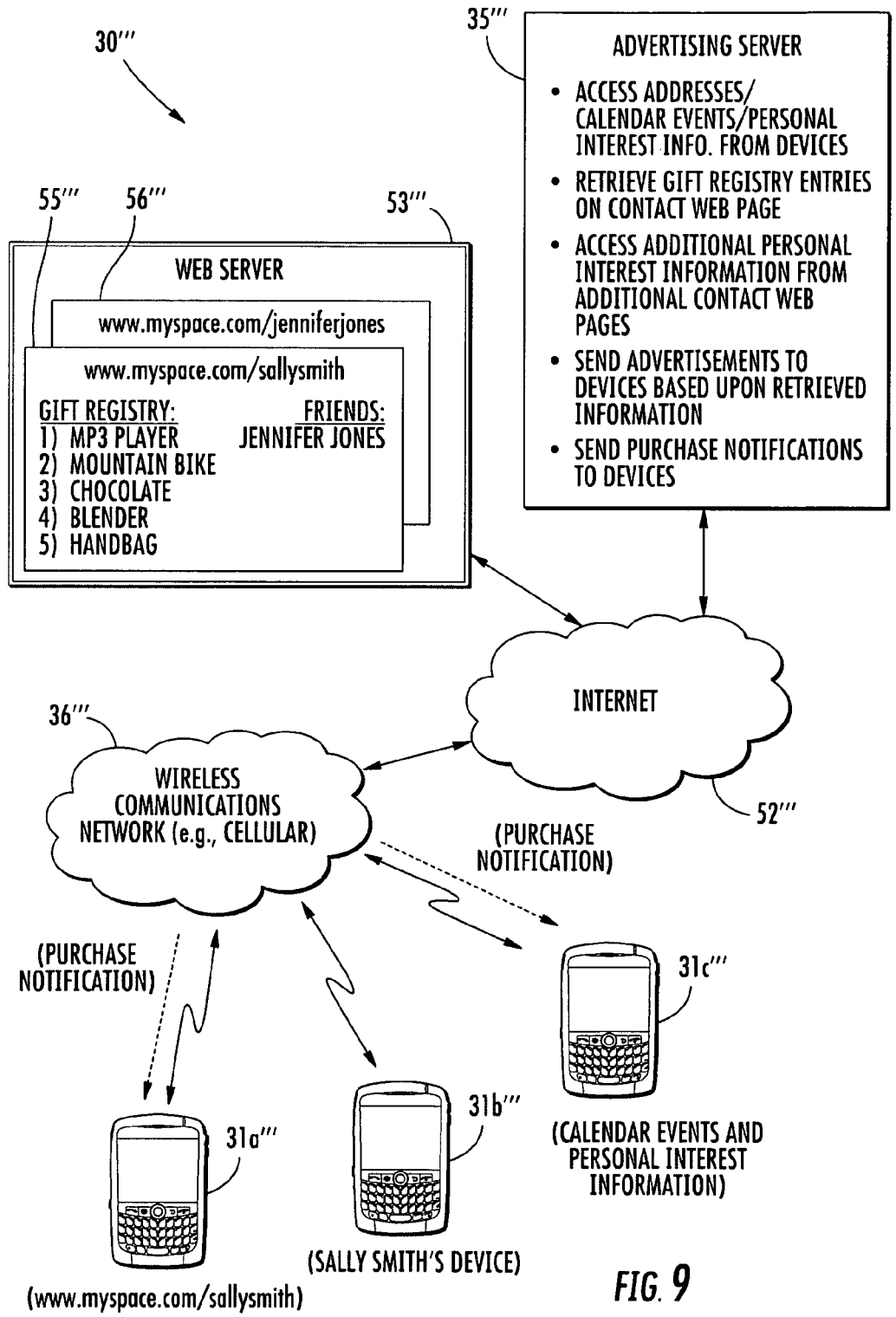
FIG. 9 is a schematic block diagram of an alternative embodiment of the communications system of FIG. 7.
Figure 10:
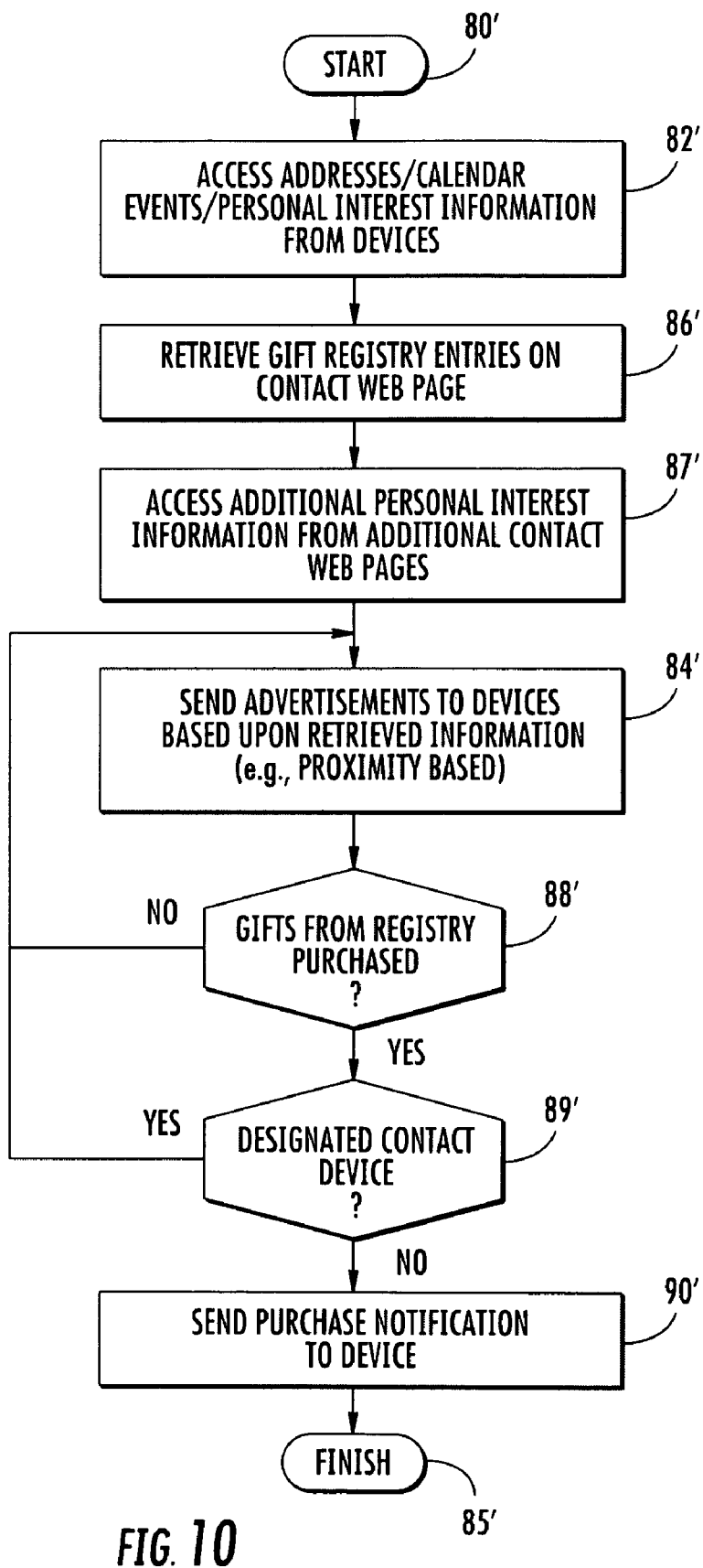
FIG. 10 is a flow diagram illustrating communication method aspects associated with the system of FIG. 9.

Referring additionally to FIGS. 9 and 10, a related system 30''' in which the contact Web pages include gift registries is now described. In the illustrated embodiment, the notification server 35''' (which in this example is an advertising server) accesses a contact Web address from the device 31a'''. In the illustrated example, the stored address is for a contact Web page 55''' for a contact Sally Smith, and the address www-.myspace.com/sallysmith. The device 31b''' is Sally Smith's personal device, and the device 31c''' is associated with another contact of Sally Smith. The device 31c''' does not have Sally Smith's contact Web page address stored thereon, but it does have calendar events (e.g., Sally's birthday) and personal interest information for Sally stored thereon.

Once the advertising server 35''' accesses the device 31a''' and retrieves the contact Web page for Sally Smith, it may advantageously access the gift registry on Sally Smith's contact Web page 55''', which in the present example illustratively includes gift registry entries including an MP3 player, a mountain bike, chocolate, a blender, and a handbag, at Block 82'. The advertising server 35''' also advantageously accesses the calendar and personal interest information for Sally Smith stored on the device 31c''' (and may access such information, as well as her contact Web page 55''', from Sally Smith's device 31b''' in some embodiments as well).

Moreover, in addition to the gift registry entries, the advertising server 35" may also advantageously retrieve additional contact information from Sally Smith's Web page 55''', such as a list of additional contacts or friends. In the illustrated example, the Web page 55''' lists an additional friend named Jennifer Jones, with an associated link to Jennifer Jones' contact Web page 56''', which in the illustrated example is www.myspace.com/jenniferjones. The advertising server 35''' may advantageously access the page 56''' to determine additional gift ideas for Sally Smith, or to obtain contact information for Jennifer Jones (e.g., an email address) to send advertisements to her as well, or both, at Block 87'.

In the context of the present gift registry embodiment, advertisements are sent to the devices 31a''', 31c''', but not Sally Smith's device 31b''', based upon the retrieved personal interest/gift information noted above, at Block 84'. That is, since Sally Smith is to be the recipient of the gifts, she may advantageously be excluded from receiving advertisements for gifts, which may indicate to her what gifts have been purchased for her already. Along these lines, the advertising server 35" may further send purchase notifications to the device 31a''' or 31c''' (but not the device 31b''' of the designated contact, here Sally Smith) when the user of the other device makes a purchase of a gift on the gift registry, at Blocks 88'-90'. That is, when someone makes a purchase of one of the gifts, the other contacts to whom ads are being sent are notified that the gift has already been purchased so they will know not to also purchase the same gift, but can instead purchase something different. Thus, the designated contact (here Sally Smith) will advantageously not know which items have been purchased for her as gifts, while others will have the benefit of knowing what has already been purchased, for example.

In some applications, if Sally Smith's page 55''' does not have a gift registry or other indications of her personal preferences for gift items, then the advertising server may advantageously retrieve personal preference information of other contacts or friends associated with Sally Smith (e.g., Jennifer Jones), and use this personal preference information as the basis for generating advertisements to send to the devices 31a''', 31c'''. That is, the advertising server 35''' may predict that friends of a designated contact are likely to share common interests and likes, as is often the case with close friends, and therefore select advertisements accordingly. The additional features discussed above, such as sending notifications based upon a proximity to calendar events (and changing the frequency thereof based upon the proximity) may also advantageously be implemented in the present gift registry embodiment, as will be appreciated by those skilled in the art.

Thus, for example, if a given contact has few or no gifts or wish list items, either in his or her wish list or as indicated in any of his or her communications, (e.g., emails, etc.), the advertising server 35''' may advantageously check the contacts of any designated friends in the user's social network or contacts in an address book for recommendations. Again, this feature is based on the premise that if someone is designated as a friend then that person will tend to like the same things that the user likes, and vice-versa.

In some embodiments, if a user indicates that he/she wants to buy a gift for someone but for whatever reason is unable to complete the transaction at that time, a reminder may be set. The reminder may be provided more frequently as the date of the event comes closer, for example. Another advantageous feature is that a user may be permitted to contribute to a gift for a given user that costs more money than what a friend could otherwise afford or wants to spend on his or her own. That is, the system would allow multiple friends to contribute and share the expense of a gift for given user. In such case, as the date of an event draws closer, reminders or notifications may advantageously be sent to a group of friends informing that them one or more friends or contacts had contributed to a gift for a given user, and asking the others if they would like to contribute so that the given user can indeed receive the gift.

Exemplary components of a hand-held mobile wireless communications device 1000 that may be used in accordance the system 20 is further described in the example below with reference to FIG. 11. The device 1000 illustratively includes a housing 1200, a keypad 1400 and an output device 1600. The output device shown is a display 1600, which may comprise a full graphic LCD. In some embodiments, display 1600 may comprise a touch-sensitive input and output device. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400 by the user. In some embodiments, keypad 1400 may comprise a physical keypad or a virtual keypad (e.g., using a touch-sensitive interface) or both.

The housing 1200 may be elongated vertically, or may take on other sizes and shapes (including clamshell housing structures). The keypad 1400 may include a mode selection key, or other hardware or software for switching between text entry and telephony entry.

Figure 11:
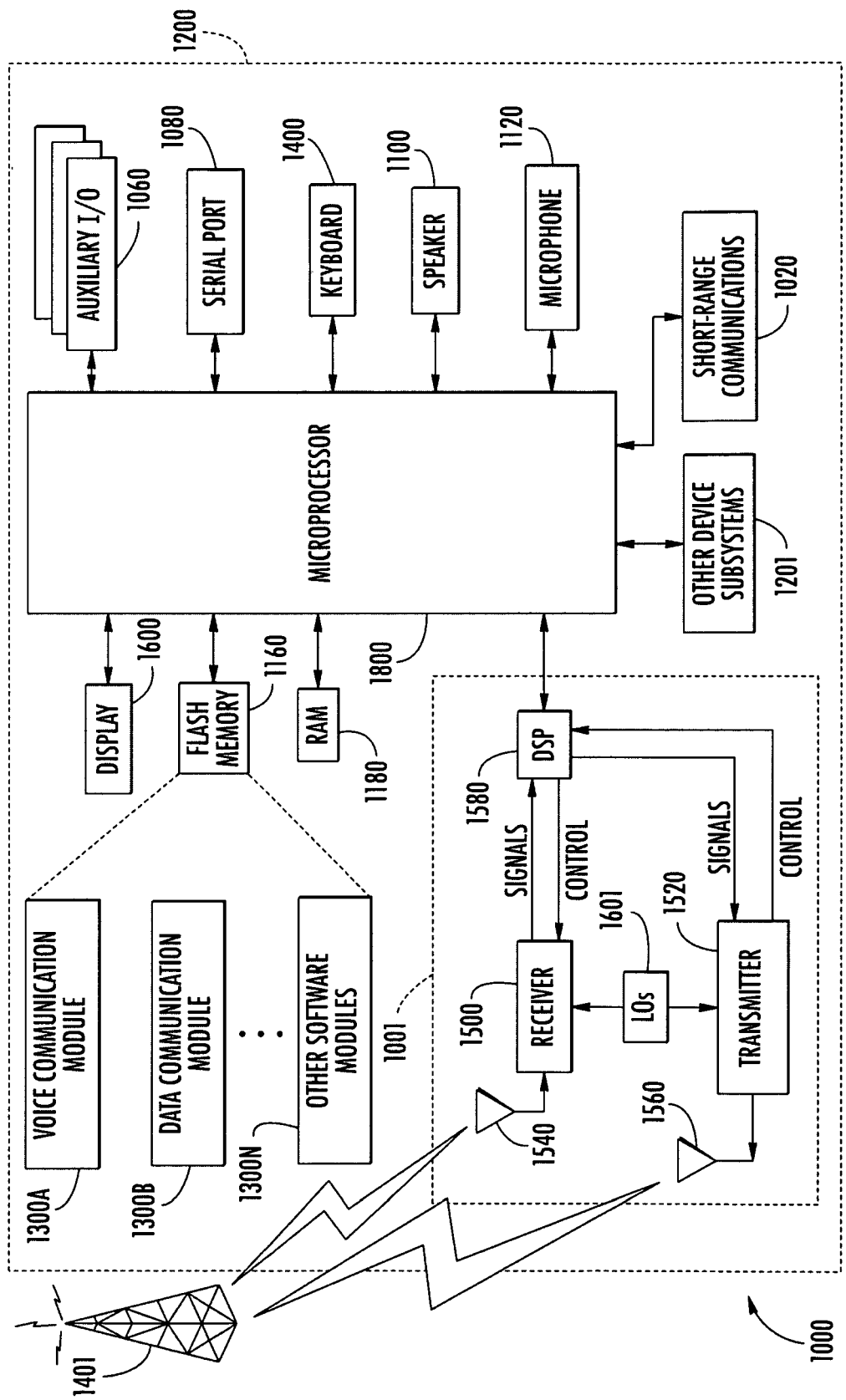
FIGS. 11 is a schematic block diagram illustrating exemplary components of a mobile wireless communications device for use with the exemplary systems.

In addition to the processing device 1800, other parts of the mobile device 1000 are shown schematically in FIG. 11. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having voice and data communications capabilities. In addition, the mobile device 1000 may have the capability to communicate with other computer systems via the Internet.

Operating system software executed by the processing device 1800 may be stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3G, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore utilizes a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control processes implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A communications system comprising:
   at least one mobile wireless communications device for storing personal interest information and for storing calendar event data; and
   a notification server communicating with said at least one mobile wireless communications device via a wireless communications network, wherein the notification server is configured to
      access the personal interest information and calendar event data from said at least one mobile wireless communications device, and
      send notifications to said at least one mobile wireless communications device based upon the personal interest information and the calendar event data and with increasing frequency based upon increasing proximity to an upcoming calendar event.

2. The communications system of claim 1 wherein the notifications comprise advertisements.

3. The communications system of claim 1 wherein the personal interest information comprises contact interest information for respective contacts.

4. The communications system of claim 1,
   wherein said notification server is operable over the Internet for accessing additional contact interest information; and
   wherein said notification sever also sends the notifications based upon the additional contact interest information.

5. The communications system of claim 4,
   wherein said at least one mobile wireless communications device is also for storing Internet addresses for the additional contact interest information; and
   wherein said notification server further accesses the stored Internet addresses from said at least one mobile wireless communications device.

6. The communications system of claim 1 wherein the personal interest information comprises one or more products of interest.

7. The communications system of claim 1,
   wherein said at least one mobile wireless communications device is also for exchanging electronic mail (email) messages with contacts; and
      wherein said notification server also sends the notifications based upon the email messages.

8. The communications system of claim 1 wherein said notification server sends the notifications based upon bids submitted from a plurality of notification sources.

9. The communications system of claim 1 wherein said at least one mobile wireless communications device comprises at least one cellular communications device.

10. A communications system comprising:
    at least one mobile wireless communications device for storing contact interest information for respective contacts and for storing calendar event data;
    a notification server communicating with said at least one mobile wireless communications device via a wireless communications network, wherein the server notification is configured to
      accessing the contact interest information and calendar event data from said at least one mobile wireless communications device, and
      sending advertisements to said at least one mobile wireless communications device based upon the contact interest information and the calendar event data and with increasing frequency based upon increasing proximity to an upcoming calendar event.

11. The communications system of claim 10 wherein the contact interest information comprises products of interest for respective contacts.

12. The communications system of claim 10,
    wherein said notification server is operable over the Internet for accessing additional contact interest information; and
    wherein said notification sever also sends the advertisements based upon the additional contact interest information.

13. The communications system of claim 10,
    wherein said at least one mobile wireless communications device is also for exchanging electronic mail (email) messages with the contacts; and
    wherein said notification server also sends the advertisements based upon the email messages.

14. A communications method comprising:
    storing calendar event data and personal interest information in at least one mobile wireless communications device;
    accessing the personal interest information and calendar event data from the at least one mobile wireless communications device using a notification server communicating with the at least one mobile wireless communications device via a wireless communications network; and
    sending notifications to the at least one mobile wireless communications device from the notification server via the wireless communication network based upon the personal interest information and the calendar event data and with increasing frequency based upon increasing proximity to an upcoming calendar event.

15. The method of claim 14 wherein the notifications comprise advertisements.

16. The method of claim 14 wherein the personal interest information comprises contact interest information for respective contacts.

17. The method of claim 14 further comprising using the notification server for accessing additional contact interest information over the Internet; and
    wherein sending comprises sending the notifications based upon the additional contact interest information.

18. The method of claim 14 wherein the personal interest information comprises products of interest.

19. The method of claim 14 further comprising exchanging electronic mail (email) messages between the at least one mobile wireless communications device and contacts; and
    wherein sending further comprises sending the notifications based upon the email messages.

* * * * *